(12) United States Patent
Wiatrowski et al.

(10) Patent No.: US 7,734,982 B2
(45) Date of Patent: Jun. 8, 2010

(54) METHOD AND APPARATUS FOR INDICATING UNCORRECTABLE ERRORS TO A TARGET

(75) Inventors: David G. Wiatrowski, Woodstock, IL (US); Gregory D. Bishop, St. Charles, IL (US); Kevin L. Good, Maple Park, IL (US); Sanjaykumar J. Karpoor, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 860 days.

(21) Appl. No.: 11/564,880

(22) Filed: Nov. 30, 2006

(65) Prior Publication Data

US 2008/0134000 A1    Jun. 5, 2008

(51) Int. Cl.
*H03M 13/15* (2006.01)
*H03M 13/35* (2006.01)

(52) U.S. Cl. .................. 714/752; 714/777; 714/783; 714/807

(58) Field of Classification Search ........... 714/752, 714/777, 783, 807
See application file for complete search history.

(56) References Cited

U.S. PATENT DOCUMENTS

| 5,517,510 | A | 5/1996 | Kuban |
| 6,745,362 | B1 | 6/2004 | Carlach |
| 7,489,675 | B2 * | 2/2009 | Wiatrowski et al. ......... 370/349 |
| 2003/0152158 | A1 | 8/2003 | Torres |

* cited by examiner

*Primary Examiner*—Stephen M Baker
(74) *Attorney, Agent, or Firm*—Valerie M. Davis (57) ABSTRACT

A first device receives first data that includes a plurality of input vectors, which includes a primary input vector and a set of secondary input vectors and detects uncorrectable errors in the first data based on a quality metric indication. Based on detecting the uncorrectable errors in the first data, the first device substitutes a predetermined codeword for the primary input vector encoded using a non-perfect code, and substitutes a predetermined input vector for the primary input vector. The first device modulates a set of encoded secondary input vectors using the predetermined input vector to generate a modulated set of encoded secondary input vectors and transmits as second data the predetermined codeword and the modulated set of encoded secondary input vectors to a target device, wherein the substituting step creates a first number of errors that is detected by the target device as uncorrectable errors in the transmitted second data.

13 Claims, 4 Drawing Sheets

METHOD AND APPARATUS FOR INDICATING UNCORRECTABLE ERRORS TO A TARGET

TECHNICAL FIELD

The present invention relates generally to digital communication systems and, in particular, to a method and apparatus for indicating errors to a receiver using forward error correction.

BACKGROUND

Digital communication systems are known to comprise base stations and repeaters in communication with a plurality of communication units. To this end, base stations and repeaters transmit and receive digital voice messages, typically over a radio frequency (RF) communication link. In the case of base stations, messages from consoles may also be transmitted and received over a wireline communication link. Both RF and wireline communication links are known to induce bit errors in transmitted digital voice messages. Indeed, high error rates can be expected over RF links, while significant error rates on wireline links, caused, for example, by switching devices, are also known.

Regardless of the source of error, digital voice messages are typically forward error correction encoded. Forward error correction techniques, often referred to as error correction codes, allow errors to be detected, and even corrected, and can be divided into two categories: perfect codes and non-perfect codes, as discussed below. Using these error correction techniques, a message is divided into small portions. Each portion is encoded to produce a codeword, which codewords are transmitted to a target over a given communication link. At the target, the codewords are decoded and most transmission errors induced by the communication link are detected and corrected. The resulting decoded portions may then be processed to reconstruct the original message. The reconstructed message can then be re-encoded for transmission over yet another communication link. This process of repetitive encoding and decoding is continued until the message has reached its final destination. For example, a message from a console to a communication unit may have to pass through a base station and a repeater before reaching the communication unit.

When transmitted over each link (e.g., between the console and base station, base station and repeater, repeater and communication unit), the message undergoes the encoding/decoding procedure described above. However, error rates on a communication link are often high enough that the error correction technique used is unable to correct all the errors in a particular portion of a message. An uncorrectable portion of a message is typically regarded as unusable. Nevertheless, if synchronization of the message is to be maintained, as is typically the case, a substitute for the uncorrectable portion, typically in the form of a special codeword not otherwise used, indicating the presence of the uncorrectable portion, can be sent to the target of the message. In this manner, the target of the message knows that the portion represented by the special codeword is irreparably corrupted and may execute procedures that mitigate the effect of the uncorrectable portion (error mitigation).

This solution is possible only if codewords exist that would not normally occur as a result of the encoding process, i.e., unused codewords. Error correction codes having unused codewords are often referred to as non-perfect codes. Non-perfect codes can be described as those codes in which a subset of codewords, less than all possible codewords, are valid (i.e., correctable). Conversely, in a perfect code, all possible codewords are valid. Thus, perfect codes used to produce binary codewords consisting of n-information bits would result in $2^n$ valid codewords. Non-perfect codes resulting in binary codewords n-bits in length would have no more than $(2^n-1)$ valid codewords. Therefore perfect codes do not contain unique and valid codewords that could otherwise be used to inform the target of uncorrectable codewords. However even with a non-perfect code, using a special codeword to indicate erasures may not always result in mitigation in the receiver. This is because during transmission the special codeword may itself become corrupt with errors that cause it not to be detected at the receiver.

Figure 1:
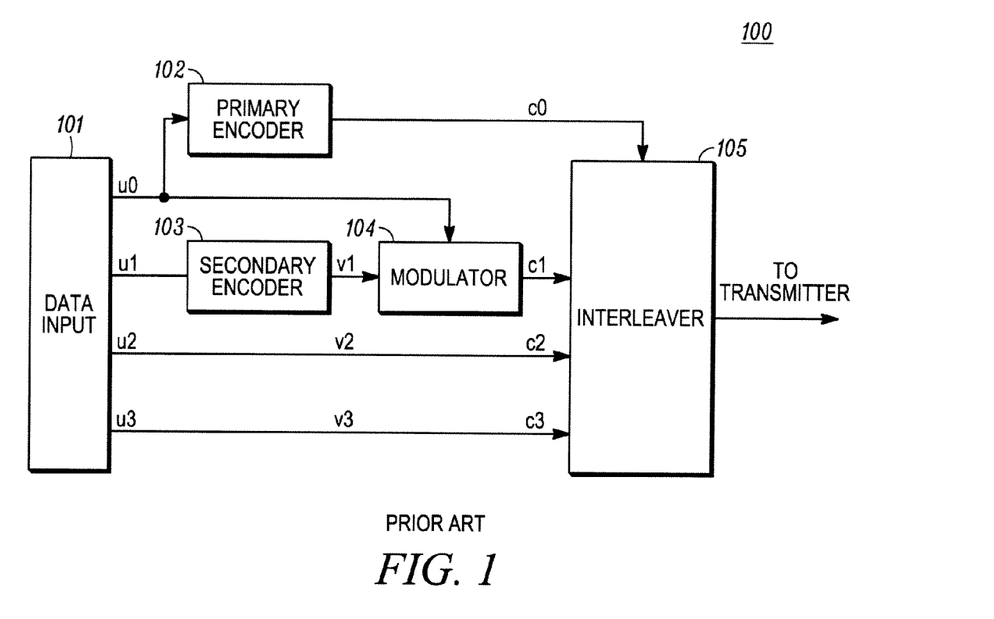
FIG. 1 is a block diagram of a forward error correction encoder in accordance with prior art techniques.
Figure 2:
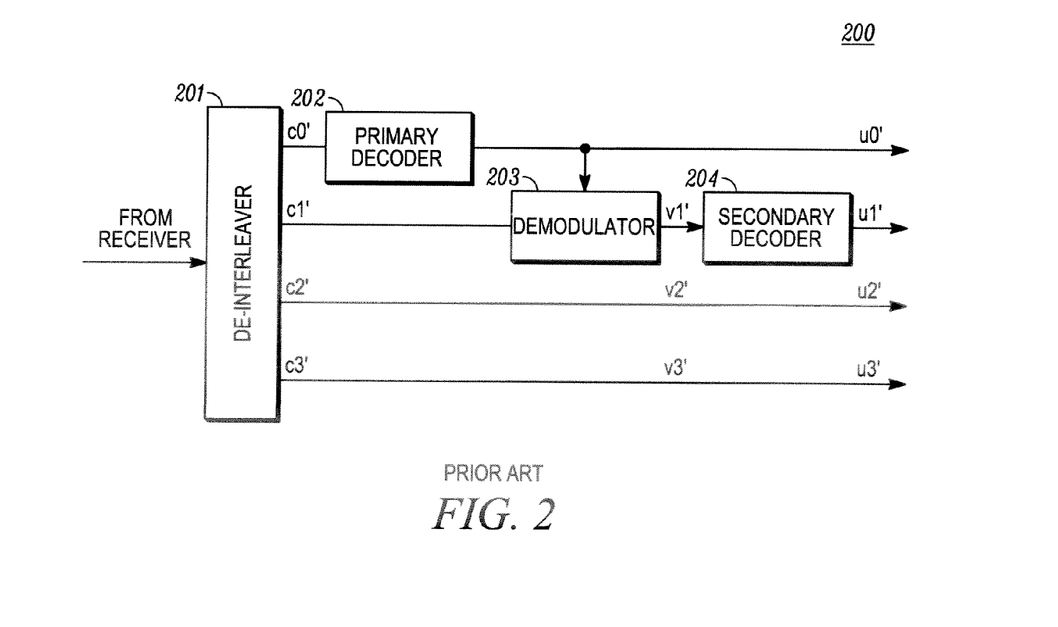
FIG. 2 is a block diagram of a forward error correction decoder that may be used in conjunction with the forward error correction encoder of FIG. 1.

Examples of forward error correction encoders and decoders using perfect error correction codes and non-perfect error correction codes are shown in FIGS. 1 and 2. In particular, a transmitter 100 and a receiver 200 operate in accordance with ETSI-DMR (European Telecommunications Standard Institute-Digital Mobile Radio) standard as defined in ETSI Technical Specifications 102 361. A data input device 101 provides a primary input vector u0 and a set of secondary input vectors u0-u3. As shown, the set of input vectors u0-u3 are error correction encoded using a primary encoder 102 and a secondary encoder 103. The primary encoder 102 encodes the primary input vector u0 using a non-perfect code such as, for instance, a non-perfect Golay (24,12) code to generate a primary encoded vector c0. The secondary encoder 103 encodes the set of secondary input vectors (and more particularly in this embodiment vector u1) using a perfect code such as, for instance, a Golay (23,12) code or a Hamming (15,11) code to generate a set of encoded secondary input vectors v1-v3. A modulator 104 is also provided in which the primary input vector u0 is used to modulate, as known in the art, the set of encoded secondary input vectors (and more particularly in this embodiment vector v1) to generate a modulated set of encoded secondary input vectors c1-c3. The primary vector c0 and the modulated set of encoded secondary input vectors c1-c3 is usually then interleaved by an interleaver 105 prior to transmission to the receiver 200.

Reversing the above process, the receiver 200 de-interleaves the received data using a de-interleaver 201 to generate a primary encoded vector c0' and vectors c1'-c3'. A primary decoder 202 decodes the received primary encoded vector c0' using a non-perfect Golay (24,12) code to generate a received primary input vector u0'. Received secondary modulated vector c1' is demodulated by a demodulator 203 using the received primary input vector u0' to generate a vector v1, which is further decoded by a secondary decoder 204 using a perfect code to generate a vector u1'. The received de-interleaved vectors are shown as c0'-c3', the demodulated secondary vectors shown as v1'-v3', and the data vectors as u0'-u3'. It is well known that errors in u1' are due to uncorrectable errors of u0', such that detectable errors appear in both u0' and u1'.

Where receiver 200 is included in an intermediary device such as a base station or a repeater which detects uncorrectable errors, the intermediary device should not simply retransmit corrupted data because this may or may not result in proper error mitigation in a target device. As stated above, the intermediary device could transmit a special codeword (as a replacement for the uncorrectable portion) that in itself serves as an indication to the target device of the uncorrectable errors, but this solution has the above-stated shortcomings associated therewith. One possible solution that avoids the above-described use of special codewords is to replace the uncorrectable portion with a representation of an audio pattern chosen so as to minimize audio degradation when the pattern is properly decoded. Message portions representing silence are often used for this purpose. The representations of silence can be chosen such that message synchronization is maintained. However, the use of encryption techniques, as is often the case in digital communication systems, causes representations of silence to be decrypted into representations of random noise, thereby frustrating the attempt to minimize audio degradation. Still other solutions could be devised in which separate indicators, aside from the codewords themselves, could be transmitted. However, these solutions require additional use of scarce bandwidth resources over the communication links, which is often not feasible.

Therefore, a need exists for a method whereby uncorrectable errors occurring in a message, despite the use of a non-perfect error correction code, can be indicated to the target of the message. Such a method should allow message synchronization to be maintained without the use of additional bandwidth.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Before describing in detail embodiments that are in accordance with the present invention, it should be observed that the embodiments reside primarily in combinations of method steps and apparatus components related to a method and apparatus for indicating uncorrectable errors to a target. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating uncorrectable errors to a target described herein. The non-processor circuits may include, but are not limited to, a radio receiver, a radio transmitter and user input devices. As such, these functions may be interpreted as steps of a method to perform the indicating of uncorrectable errors to a target described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment of the present invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory), a Flash memory, and the like. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, the present invention describes a method and apparatus for a sending device to indicate the presence of uncorrectable errors to a target device. A set of input vectors comprising a primary input vector and at least a secondary input vector is provided at the sending device. The secondary input vector is error correction encoded, and the resulting secondary vector is modulated with a predetermined input vector to produce a secondary modulated vector. A predetermined codeword, equivalent in form to other valid codewords, is sent along with the secondary modulated vector to the target instead of sending the primary input vector encoded using a non-perfect code. In one embodiment the predetermined codeword is selected to maximize the error count in the target device.

Upon receiving the predetermined codeword and the secondary modulated vector, the target decodes the predetermined codeword and the resulting decoded predetermined codeword is used to demodulate the secondary modulated vector. As the predetermined codeword is chosen such that when decoded, it is not identical to the predetermined input vector, the secondary demodulated vector contains a sufficient number of errors to indicate to the target device that the set of input vectors contains errors. In this manner, the presence of uncorrectable errors is made known to the target device without affecting the synchronization of the message and without utilizing additional bandwidth.

Figure 3:
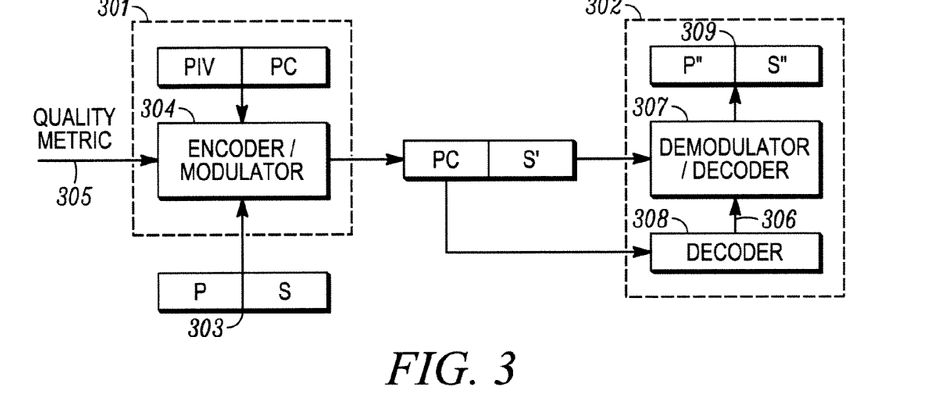
FIG. 3 is a block diagram of a first embodiment of a communication system in accordance with the present invention.

Embodiments of the present invention are more fully described with reference to FIGS. 3-6. FIG. 3 illustrates a first embodiment of the invention, wherein a communication system 300 comprising a sending device 301 and a receiving or target device 302 is shown and wherein the teachings herein are described in general. A set of input vectors 303 comprising a primary input vector and a set of secondary input vectors (P and S, respectively) are provided. The set of input vectors 303 may comprise packets of bits generated by a digital voice compressor, such as an Advanced Multiband Excitation speech encode (AMBE) as are known in the art. Additionally, it is assumed that the set of input vectors 303 have been previously error correction encoded/decoded to derive a quality metric 305 (also referred to herein as a quality metric indication). The quality metric serves to indicate the presence/absence of uncorrectable errors in the set of input vectors 303.

In the context of the present invention, an uncorrectable error comprises any bit error occurring in the set of input vectors, or any vector derived therefrom, which are beyond the correcting power of the particular error correction code used. Any suitable methods can be used to establish the quality metric 305, e.g., signal-to-noise ratios, received carrier signal strengths, cyclic redundancy checks (CRC), and the like.

An encoder/modulator 304 error correction encodes the set of secondary input vectors, using an error correcting code that could be a perfect code or a non-perfect code, to provide a set of encoded secondary input vectors. Also, where no uncorrectable errors are detected, the primary input vector is encoded using an error correction encoder (not shown) that is separate from that used to encode the set of secondary input vectors. It is hereinafter assumed that all error correction codes incorporated in the present invention uses a non-perfect code in the primary encoder and either a non-perfect code or a perfect code in the secondary encoder, as defined previously.

If the quality metric 305 indicates the presence of at least one uncorrectable error in the set of input vectors 303, the encoder/modulator 304 uses a predetermined input vector (PIV) to modulate the secondary set of encoded vectors instead of using the primary input vector. The encoder/modulator 304 modulates the secondary set of encoded vectors using, for example, a pseudo-random bit modulator of the type described in the Association of Public-Safety Communications Officials International Project 25 Common Air Interface suite of standard protocols as defined in TIA 102. The resulting modulated set of encoded secondary input vectors (S') and a predetermined codeword (PC) are then sent to the target 302. In accordance with embodiments of the present invention, instead of encoding the primary input vector using a non-perfect code and sending the encoded primary input vector to the target device 302, the sending device sends the predetermined codeword.

The predetermined input vector and the predetermined codeword are chosen so as to produce a sufficient number of errors in the decoding process at the target device 302. In particular, the predetermined codeword, when error correction decoded, has a large Hamming distance from the predetermined input vector. Stated another way, the predetermined codeword when decoded at the target device results in a vector having numerous bit-differences compared to the predetermined input vector. Accordingly, when a decoder 308 in the target device 302 decodes the predetermined codeword, the resulting decoded predetermined codeword 306 will be substantially different, bit-wise, from the predetermined input vector originally used for modulation at the sending device 301. Thus, reconstruction of the secondary set of input vectors by a demodulator/decoder 307 in the target device 302, using the decoded predetermined codeword 306 to demodulate the secondary set of modulated vectors, causes numerous uncorrectable errors to occur in a reconstructed set of input vectors 309.

Detecting the uncorrectable errors in the reconstructed set of input vectors 309, the demodulator/decoder 307 causes the target device 302 to initiate error mitigation procedures, such as substitution of previously received sets of input vectors for the uncorrectable set of input vectors. Alternatively, audio resulting from the uncorrectable set of input vectors can be muted. Regardless, the present invention provides notification of uncorrectable errors to a message's target such that error mitigation procedures are induced. This is a result of causing the target to receive the uncorrectable data in a highly corrupted state. Additionally, by using predetermined codewords in place of "normal" codewords, synchronization of the message is maintained.

Figure 4:
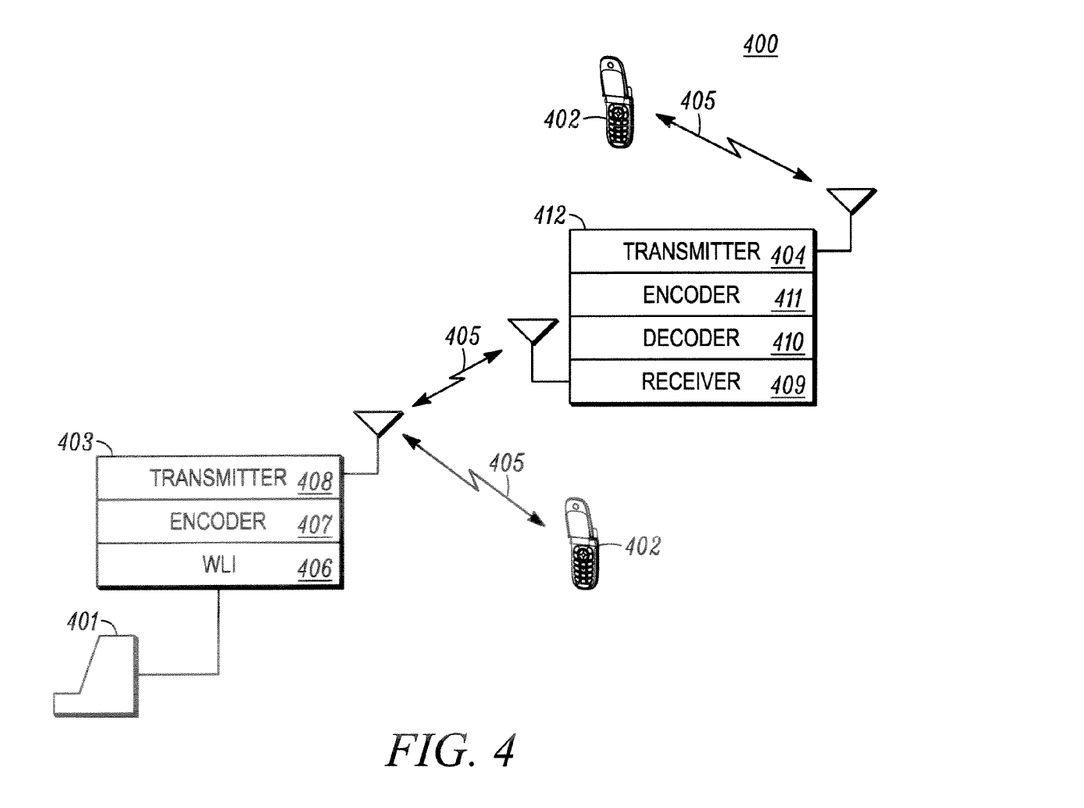
FIG. 4 is a block diagram of a second embodiment of a communication system in accordance with the present invention.

FIG. 4 illustrates a second embodiment of the present invention. In particular, a wireless communication system 400, comprising a console 401, a plurality of communication units 402, a base station 403, a repeater 412, and a plurality of wireless communication resources 405, is shown. The communication system 400 can be a conventional or trunked system, and may incorporate encryption/decryption techniques. The plurality of wireless communication resources 405 may comprise an RF channel such as pairs of frequency carriers, time division multiplexed TDM slots, or any other RF transmission medium. In one embodiment, the communication units 402, base stations 403 and repeater 412 operate in accordance with the ETSI-DMR standard.

The communication units 402, which can be portable or mobile radios, for example, provide voice and data communications in the form of encoded/modulated digital information, as described above. The communication units 402 are capable of demodulating and decoding a set of encoded input vectors and generating voice or data based on the set of input vectors. The base station 403 provides an interface from the console 401 to the communication system 400. The base station 403 receives a set of input vectors representing voice or data from a wireline interface 406. An encoder 407 encodes the set of input vectors, creating a set of encoded vectors, which an RF transmitter 408 RF modulates and transmits, via the wireless communication resource 405, to the repeater 412 and communication units 402. Additionally, the encoder 407 determines if the set of input vectors contains any uncorrectable errors and, if so, encodes the set of input vectors similar to the operation of the sending device 301 of FIG. 3.

The repeater 412 is used to extend coverage of the wireless communication system 400. An RF receiver 409 receives the received set of encoded vectors and sends them to a decoder 410. The decoder 410 operates in accordance with the target device 302 of FIG. 3. If the set of input vectors was encoded using the predetermined input vector and predetermined codeword, as described above, the decoder 410 will cause the repeater 412 to initiate error mitigation. In such an event, an encoder 411, similar in operation to the encoder 407 of the base station 403, can encode a set of substitute vectors in an effort to mitigate the effect of the uncorrectable errors. Alternatively, the encoder 411 can again encode the uncorrectable data using the predetermined input vector and predetermined codeword so as to cause error mitigation by any communication units 402 that may receive the message. Similar to the RF transmitter 408 in the base station 403, an RF transmitter 404 at the repeater RF modulates the set of encoded vectors onto the wireless communication resource 405. Operation of the encoders 407, 411 is described in more detail with reference to FIGS. 5 and 6.

Figure 5:
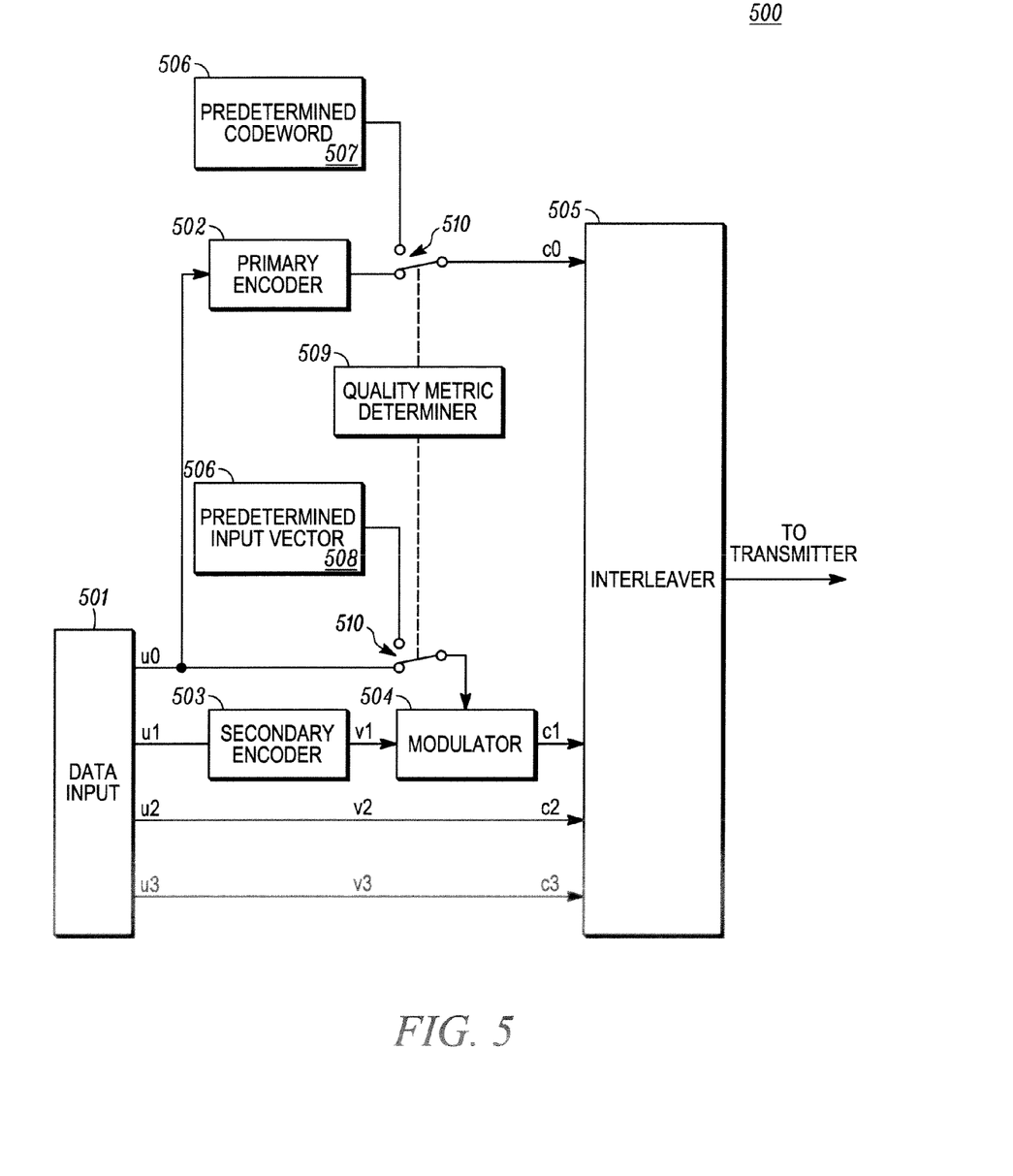
FIG. 5 is a block diagram of another embodiment of the present invention.

FIG. 5 is a block diagram of a forward error correction encoder in accordance with an embodiment of the present invention. Specifically, the forward error correction coder 500 is in accordance with the ETSI-DMR standard. The forward error correction encoder 500 comprises a data input device 501, a primary error correction encoder 502, at least one secondary error correction encoder 503, a pseudo-random bit modulator 504, a bit interleaver 505, a storage device 506, and a quality metric determiner 509. The storage device 506, which may comprise a non-volatile memory device such as read-only memory, stores at least a predetermined input vector 508 and a predetermined codeword 507. In practice, the primary error correction encoder 502, secondary error correction encoder 503, pseudo-random bit modulator 504, bit interleaver 505, and quality metric determiner 509 can be implemented as software routines stored in the storage device 506 and executed on a processing device such as, for instance, a microprocessor.

The data input device 501 provides a set of input vectors u0-u3 of voice or data. In the event that the data input device 501 comprises an encryption device, an analogous decryption device is required at the target device. Although four vectors are shown, the present invention can be adopted for any number of input vectors. Assuming that there are no uncorrectable errors in the set of input vectors u0-u3, the primary error correction encoder 502 encodes a primary input vector u0, using a non-perfect error correction code such as the Golay (24,12) code, to produce a primary encoded vector c0. In contrast, the secondary error correction encoder 503 encodes a set of secondary input vectors u1-u3 (or particularly encodes only vector u1 in this embodiment), using at least one perfect error correction code such as the Golay (23,12) and/or Hamming (15,11) codes for producing a set of encoded secondary input vectors v1-v3.

Again assuming that there are no uncorrectable errors in the set of input vectors u0-u3, the quality metric determiner 509 controls switches 510 so that the primary input vector u0 is routed as a seed vector to the pseudo-random bit modulator 504, as shown in FIG. 5. As is known in the art, the pseudo-random bit modulator 504 modulates the secondary encoded vector v1 using the primary input vector u0 as the seed vector. In particular, the pseudo-random bit modulator 504 generates, based on the seed vector, a set of pseudo-random vectors which modulate the secondary encoded vector v1 via a logical operation, such as an exclusive-OR. The resulting secondary modulated vector c1, in addition to the primary encoded vector c0 and the unencoded vectors c2 and c3, are bit interleaved by the bit interleaver 505. The resulting interleaved vector is sent to a transmitter, e.g., RF transmitters 408, 404.

The quality metric determiner 509 monitors the set of input vectors for errors and makes a decision about their integrity. For example, a cyclic redundancy code (CRC), as known in the art, can be used. At the original source of the set of input vectors, e.g., a dispatch console, CRC encoding can be performed. Although not shown taking the set of input vectors u0-u3 as input in FIG. 5, the quality metric determiner 509 can decode the CRC code to determine if the set of input vectors u0-u1 has been irreparably corrupted.

If it is determined by the quality metric determiner 509 that the set of input vectors u0-u1 is unusable, the quality metric determiner 509 controls switches 510 so that the predetermined codeword 507 is substituted for the primary encoded vector c0, and that the predetermined input vector 508 serves as the seed vector for the pseudo-random bit modulator 504. The predetermined codeword 507 and the predetermined input vector 508 are chosen to produce enough errors in the decoding process such that error mitigation procedures are induced in the receiver. For example, assuming the use of a non-perfect Golay (24,12) code for the primary encoder 502, the predetermined codeword 507 may comprise 070001 (hexadecimal) and the predetermined input vector 508 may comprise 070 (hexadecimal). As used in the present invention, such values have been shown to cause a number of decoder bit errors approximately equivalent to a communication link having a 50% bit error rate. Such a bit error rate essentially guarantees that error mitigation will be induced.

Figure 6:
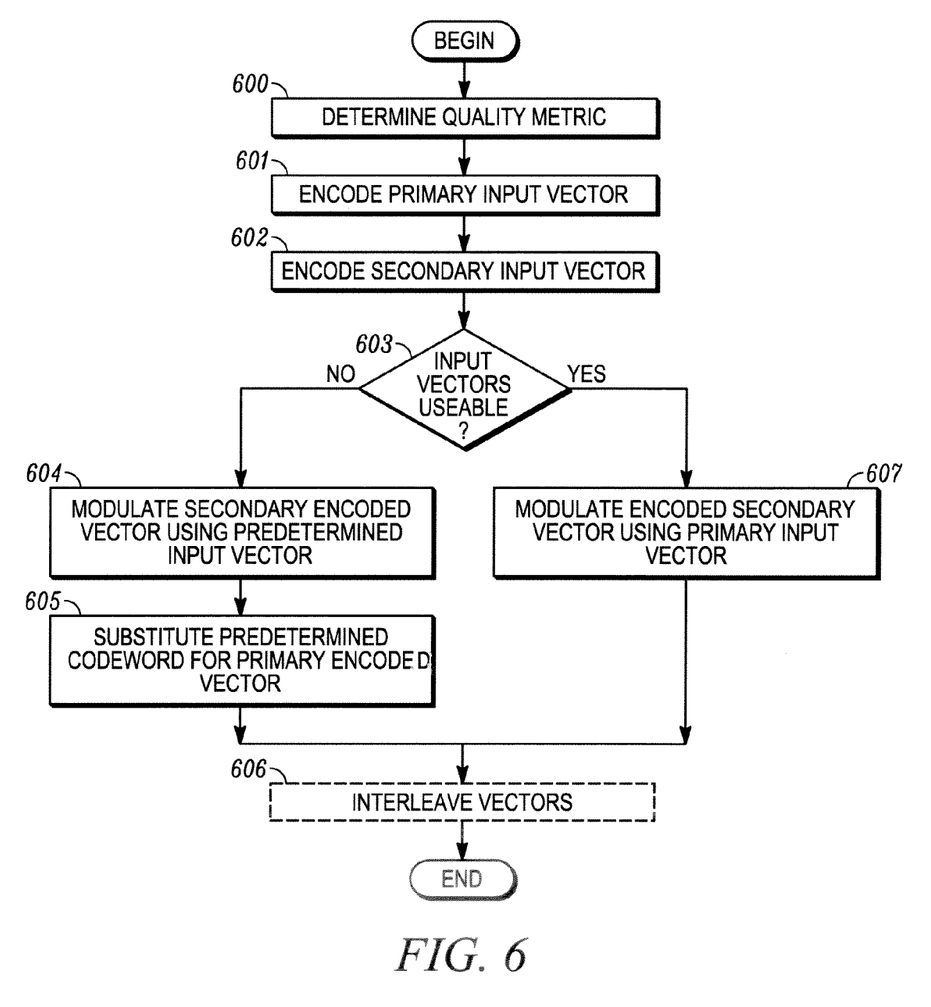
FIG. 6 is a flow diagram that describes operation of the embodiment of FIG. 5.

FIG. 6 illustrates a method of forward error correction in accordance with the embodiment described by reference to FIG. 5. At step 600, the set of input vectors u0-u3 is examined by the quality metric determiner 509 to derive a quality metric. The quality metric comprises a binary indication whether the set of input vectors u0-u1 contains any uncorrectable errors. For example, if a CRC is used to implement the quality metric determiner 509, the quality metric will indicate uncorrectable errors when the CRC does not match the expected value. Notwithstanding the determination of the quality metric, the primary input vector u0 can be optionally encoded with a non-perfect code such as a Golay (24,12) using the primary error correction encoder 502 at step 601 or this step can be performed only upon a determination that there are no uncorrectable errors in the input vector. Additionally, at step 602, the secondary input vector u1 is encoded by the secondary error correction encoder 503. In an embodiment, the secondary error correction encoder 503 comprises a Golay (23,12) and/or Hamming (15,11) perfect code encoder for the vector u1.

At step 603, the quality metric derived at step 600 is checked to determine if the set of input vectors u0-u1 is usable, i.e., a determination is made if it contains uncorrectable errors. If the set of input vectors u0-u1 is usable, step 607 is performed. At step 607, the secondary input vector u1 is modulated with pseudo random data using the primary input vector u0 as the seed vector for the pseudo-random bit modulator 504. At step 606, the primary vector c0 and the secondary set of vectors c1-c3 are optionally interleaved by the vector interleaver.

If, at step 603, the vectors are determined to be unusable, alternate actions are taken beginning with step 604. At step 604, the secondary input vector u1 is modulated with pseudo random data using the predetermined input vector 508 as the seed for the pseudo-random bit modulator 504. This will result in distributing the intentional errors in the predetermined input vector to the remaining vectors. Additionally, at step 605, the predetermined codeword 507 is substituted for the primary encoded vector c0. As described above, the predetermined codeword 507 and the predetermined input vector 508 will cause a large number of errors to occur in the remaining vectors, ultimately resulting in the performance of error mitigation procedures at the target. Finally, at step 606, the predetermined codeword 507 and the secondary set of modulated vectors c1-c3 are optionally interleaved by the vector interleaver.

The present invention describes a method and apparatus for a sending device to indicate the presence of uncorrectable errors to a target device despite the use of a non-perfect error correction code. Prior art systems using non-perfect codes rely on unique, unused codewords to signal an irreparably corrupted message. A drawback to these systems is that a unique unused codeword is also subject to transmission errors and may not be detected as the erasure frame indication. This means the vocoder at the receiving end will not invoke error mitigation procedures, which in turn means that the listener will likely hear poor quality audio. Using a predetermined codeword and a predetermined input vector, as described above, the present invention substantially guarantees that the presence of uncorrectable errors will be detected at the target, thereby causing the use of error mitigation procedures. In this manner, the present invention preserves message synchronization while not requiring additional bandwidth.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

We claim:

1. A method for indicating to a target device the presence of uncorrectable errors in transmitted data, the method comprising the steps of:
    receiving first data comprising a plurality of input vectors, which includes a primary input vector and a set of secondary input vectors;
    encoding the set of secondary input vectors using an error correcting code to generate a set of encoded secondary input vectors;
    determining a quality metric indication associated with the first data;
    detecting uncorrectable errors in the first data based on the quality metric indication;
    based on detecting the uncorrectable errors in the first data, substituting a predetermined codeword for the primary input vector encoded using a non-perfect code, and substituting a predetermined input vector for the primary input vector;
    modulating the set of encoded secondary input vectors using the predetermined input vector to generate a modulated set of encoded secondary input vectors; and
    transmitting as second data the predetermined codeword and the modulated set of encoded secondary input vectors to the target device, wherein the substituting step creates a first number of errors that is detected by the target device as uncorrectable errors in the transmitted second data.

2. The method of claim 1, wherein the non-perfect code comprises a non-perfect Golay (24,12) code.

3. The method of claim 1, wherein the target device decodes the predetermined codeword generating a result that is different from the predetermined input vector and creating the first number of errors.

4. The method of claim 1, wherein the quality metric indication comprises a cyclic redundancy code (CRC).

5. The method of claim 1, wherein the error correcting code comprises one of a Golay (23,12) code and a Hamming (15, 11) code.

6. The method of claim 1, wherein:
    encoding the set of secondary input vectors comprises encoding one of three secondary input vectors;
    modulating the set of encoded secondary input vectors comprises modulating the one encoded secondary input vector; and
    the second data comprises the predetermined codeword, the one modulated and encoded secondary input vector and the two other secondary input vectors.

7. The method of claim 6 further comprising the step of interleaving the second data prior to transmitting it to the target device.

8. Apparatus for indicating to a target device the presence of uncorrectable errors in transmitted data, the apparatus comprising:
    an interface receiving first data comprising a plurality of input vectors, which includes a primary input vector and a set of secondary input vectors; and
    a processing device coupled to the interface and performing the steps of,
        encoding the set of secondary input vectors using an error correcting code to generate a set of encoded secondary input vectors;
        determining a quality metric indication associated with the first data;
        detecting uncorrectable errors in the first data based on the quality metric indication;
        based on detecting the uncorrectable errors in the first data, substituting a predetermined codeword for the primary input vector encoded using a non-perfect code, and substituting a predetermined input vector for the primary input vector; and
        modulating the set of encoded secondary input vectors using the predetermined input vector to generate a modulated set of encoded secondary input vectors; and
    a transmitter coupled to the processing device and transmitting as second data the predetermined codeword and the modulated set of encoded secondary input vectors to the target device, wherein the substituting step creates a first number of errors that is detected by the target device as uncorrectable errors in the transmitted second data.

9. The apparatus of claim 8, wherein the interface comprises one of a radio frequency receiver and a wireline interface.

10. The apparatus of claim 8, wherein the apparatus is included in an intermediary device comprising one of a base station and a repeater.

11. The apparatus of claim 10, wherein the intermediary device operates in accordance with ETSI-DMR (European Telecommunications Standard Institute-Digital Mobile Radio) standard.

12. A computer-readable storage element having computer readable code stored thereon for programming a computer to perform a method for indicating to a target device the presence of uncorrectable errors in transmitted data, the method comprising the steps of:

obtaining first data comprising a plurality of input vectors, which includes a primary input vector and a set of secondary input vectors;

encoding the set of secondary input vectors using an error correcting code to generate a set of encoded secondary input vectors;

determining a quality metric indication associated with the first data;

detecting uncorrectable errors in the first data based on the quality metric indication;

based on detecting the uncorrectable errors in the first data, substituting a predetermined codeword for the primary input vector encoded using a non-perfect code, and substituting a predetermined input vector for the primary input vector; and modulating the set of encoded secondary input vectors using the predetermined input vector to generate a modulated set of encoded secondary input vectors that is transmitted with the predetermined codeword as second data to the target device, wherein the substituting step creates a first number of errors that is detected by the target device as uncorrectable errors in the transmitted second data.

13. The computer-readable storage medium of claim 12, wherein the computer readable storage medium comprises at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory.

\* \* \* \* \*